United States Patent [19]

Learned

[11] Patent Number: 4,925,190
[45] Date of Patent: May 15, 1990

[54] COMBINATION GOLF CLUB AND TURF REPAIR TOOL

[76] Inventor: Thomas J. Learned, 2127 Gillespie St., Santa Barbara, Calif. 93101

[21] Appl. No.: 342,734

[22] Filed: Apr. 24, 1989

[51] Int. Cl.$^5$ .......................... A01B 1/04; A63B 53/00
[52] U.S. Cl. ............................... 273/162 F; 273/32 B; 172/378
[58] Field of Search ................. 273/162, 32 B, 162 R, 273/162 F; 172/378

[56] References Cited

U.S. PATENT DOCUMENTS

| | | | |
|---|---|---|---|
| 2,083,175 | 6/1937 | Werner | 273/162 C |
| 3,185,483 | 5/1965 | Klynman | 273/162 D |
| 3,771,794 | 11/1973 | Crockett | 273/162 F |
| 3,774,913 | 11/1973 | Dien | 273/162 D |

Primary Examiner—George J. Marlo
Attorney, Agent, or Firm—Marvin E. Jacobs

[57] ABSTRACT

A golf ball mark repair tool is mounted on a hand grip end of the shaft of a golf club. The repair tool has a mounting base secured to the hand grip end of the shaft, and an elongated prong attached to one end of the base and projecting therefrom. The prong has a configuration for prying turf to repair a ball mark. The shaft of the golf club provides a handle extension for the base of sufficient length for permitting a player to operate the tool to repair the ball mark by gripping the handle extension while standing erect. The repair tool also includes a protective cover removably mounted to the club shaft end and having a hollow interior for extending over and enclosing the turf prying prong. Preferably, the cover constitutes an extension of the club hand grip.

14 Claims, 2 Drawing Sheets

COMBINATION GOLF CLUB AND TURF REPAIR TOOL

DESCRIPTION

1. Technical Field

The present invention generally relates to the game of golf and, more particularly, to a golf club mounted and operated tool and method for repairing ball marks.

In the game of golf, it is a common occurrence for a player to drive a golf ball onto a green with enough force to indent or mark the playing surface. Playing courtesy dictates that the player repair the mark so that the quality of the green surface will not be impaired and the putting games of other players will not be adversely affected.

2. Description of the Prior Art

Tools for repairing ball marks have been proposed in the prior art. Representative of the prior art are the repair tools disclosed in U.S. Pat. Nos. 3,185,483 to Klynman and 3,774,913 to Dien. Some golfers make routine use of ball mark repair tools; however, many still do not. The latter golfers either leave the mark unrepaired or attempt to repair it in other less effective ways, some of which may compound the injury to the green, such as by scuffing the mark using the spikes on his or her golf shoes.

Underlying the present invention is recognition by the inventor herein that the source of this problem of lack of adoption of a routine practice of repair tool use is that prior art repair tools are designed to be held in the hand of the golfer when used. Thus, to use the tool, the golfer must first search for the tool in a pocket or on the golf bag or remove the tool from the putter. Then, the player must bend over to extend his or her hand to ground level in order to repair the ball mark with the tool. To repair the mark the prongs are inserted into the green below the mark and if necessary, the tool is rotated side to side to repair the green. The tool is held between the thumb and forefinger and requires signficant force to hold and operate the tool.

The failure of many players to use repair tools can be traced to the design of the tools themselves. The tools are relatively inconvenient and difficult to use, and, thus, players do not become accustomed to the practice of routinely repairing marks. The hand-held requirement of the tool designs tends to discourage rather than encourage repair tool use.

Moreover, the necessity to bend over to use the hand-held repair tools is more than an inconvenience for a considerable number of players. Due to advanced age or a disability, these players are incapable of or have great difficulty in bending that far to repair a ball mark. Also, the tool is small and is easily misplaced or lost.

Consequently, a need still exists for a repair tool which will solve the above-cited problem of the prior art by providing a more "user friendly" approach to carrying out ball mark repair.

STATEMENT OF THE INVENTION

The present invention provides a golf club mounted and operated ball mark repair tool and method designed to satisfy the aforementioned needs. The golf club tool of the present invention provides an effective and practical solution to the above-cited problem by securely mounting the tool in the golf club hand grip and employing the golf club itself as an extension of the tool for operating the tool in repairing ball marks. The club mounted repair tool will allow the player to repair a ball mark on the green surface with little effort and without bending down to ground level.

Accordingly, the present invention is directed to a ball mark repair tool in combination with a golf club. The golf club, such as a putter, has an elongated shaft with a ball striking head mounted to one end and an elongated hand grip mounted about a portion of the shaft adjacent to an opposite end. The repair tool comprises: (a) a base secured to the opposite end of the shaft adjacent to the hand grip such that the shaft provides a handle extension for operating the tool to repair a ball mark; and (b) an elongated element attached to the base and projecting therefrom and beyond an end of the hand grip of the club. The element has a configuration for prying turf to repair the ball mark as the tool is operated by a player holding the club by the head thereof in a ball mark repairing orientation being substantially the reverse of a normal playing orientation. The club shaft provides an extension of the tool base permitting the player to operate the tool while standing substantially erect.

The repair tool also includes a protective cover removably mounted to the club shaft opposite end and having a hollow interior for extending over and enclosing the turf prying element. Preferably, the cover constitutes an extension of said club hand grip.

Also, the present invention is directed to a golf ball mark repair tool which comprises: (a) a base; and (b) an elongated element attached to one end of the base and projecting therefrom in a first direction, the element having a configuration for prying turf to repair a ball mark. Further, the base has an elongated handle extension attached thereto and extending therefrom in a direction opposite to the first direction. The handle extension is of sufficient length for permitting a player to operate the tool to repair the ball mark by gripping the handle extension while standing substantially erect. Preferably; the handle extension is a shaft of a golf club which is manipulated by grasping the head of the club in the hand of the user.

Further, the present invention is directed to a method for manually repairing a ball mark on a playing surface of a golf course green. The method comprises the steps of: (a) holding a golf club in a ball mark repairing orientation being substantially the reverse of a normal playing orientation; (b) inserting an outwardly projecting prong of a tool mounted on a hand grip end of the golf club into the turf of the green under one side of the ball mark; and (c) pivoting the club toward the green to cause the portion of the turf containing the mark to rise upwardly. The method also optionally includes the steps of: (d) removing the tool prong from under the first side of the mark; (e) inserting the tool prong under another side of the mark; and (f) pivoting the club toward the green to cause the portion of the turf containing the mark to rise toward the surface of the green. As the club pivots downwardly, the tool pivots on the bottom surface of the prong as a fulcrum to pivot the prongs upwardly toward the green. The long handle provides increased leverage allowing application of a small amount of force to the club head to achieve the desired pivoting and turning of the prongs of the tool. The mark is easily lifted with little force and without the need to bend of stoop to repair a mark.

These and other features and advantages of the present invention will become apparent to those skilled in the art upon a reading of the following detailed description when taken in conjuction with the drawings wherein there is shown and described an illustrate embodiment of the invention.

BRIEF DESCRIPTION OF THE DRAWINGS

In the course of the following detailed description, reference will be made to the attached drawings in which.

DETAILED DESCRIPTION OF THE INVENTION

Figures 1, 2, 3, 4:
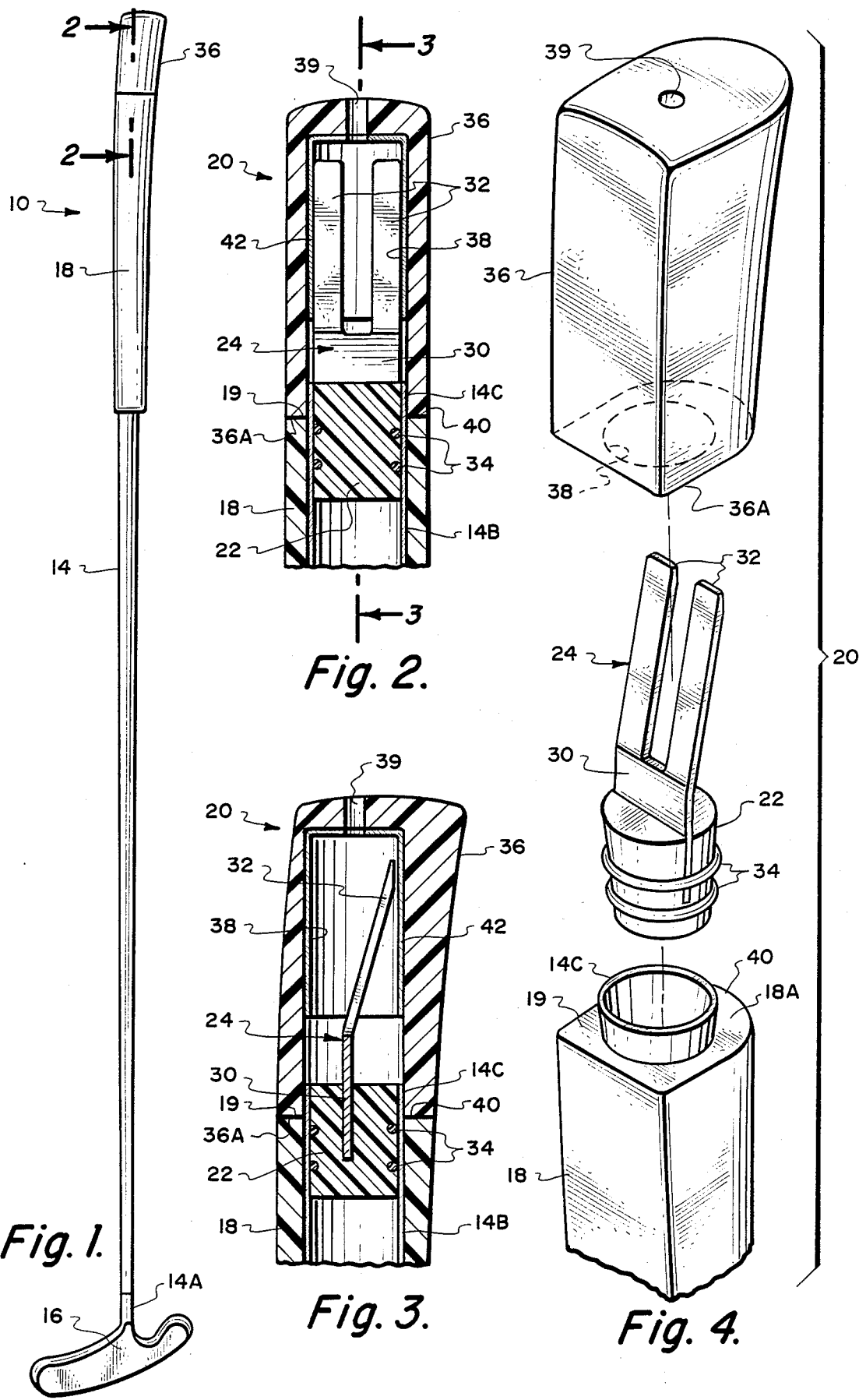
FIG. 1 is an elevational view of a golf club incorporating a ball mark repair tool in accordance with the present invention.
FIG. 2 is an enlarged fragmentary longitudinal sectional view of an upper portion of the hand grip of the club taken on line 2—2 of FIG. 1 which incorporates the ball mark repair tool in accordance with the present invention.
FIG. 3 is another longitudinal sectional view of the club upper hand grip portion taken along line 3—3 of FIG. 2, illustrating the tool at an orientation ninety degrees from that of FIG. 2 with an optional reinforcing insert contained in a cover of the tool.
FIG. 4 is a fragmentary exploded perspective view of the club upper hand grip portion and the repair tool.

Referring now to the drawings, and particularly to FIG. 1, there is shown a conventional golf club 10, universally known as a "putter". As is well known, the putter 10 is used primarily in stroking a golf ball on the playing surface of a golf course green 12 (FIGS. 5a–5d). The golf club 10 has an elongated shaft 14 with a ball striking head 16 mounted to one end 14A of the shaft and an elongated hand grip 18 mounted about an axial portion 14B of the shaft 14 adjacent to an opposite end 14C thereof.

Figure 5A:
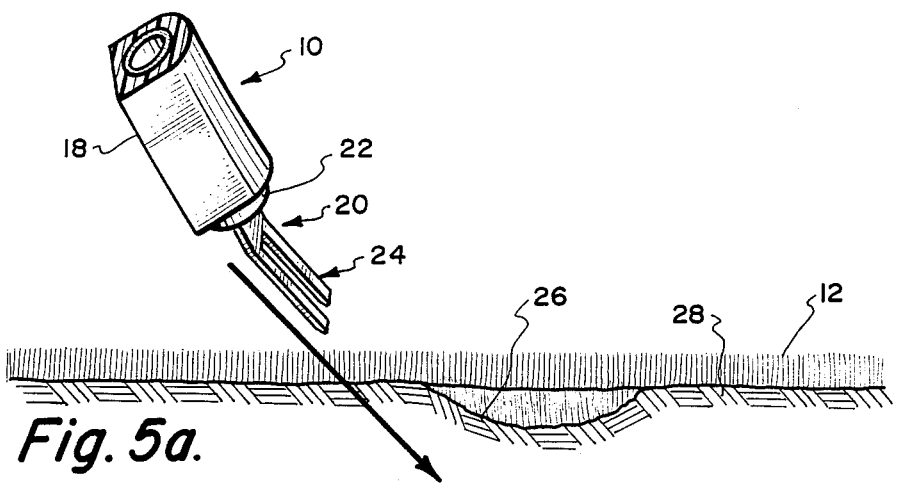
FIGS. 5a–5d are a sequence of views illustrating the successive steps in using the tool to repair a ball mark on a green playing surface.
Figure 5B:
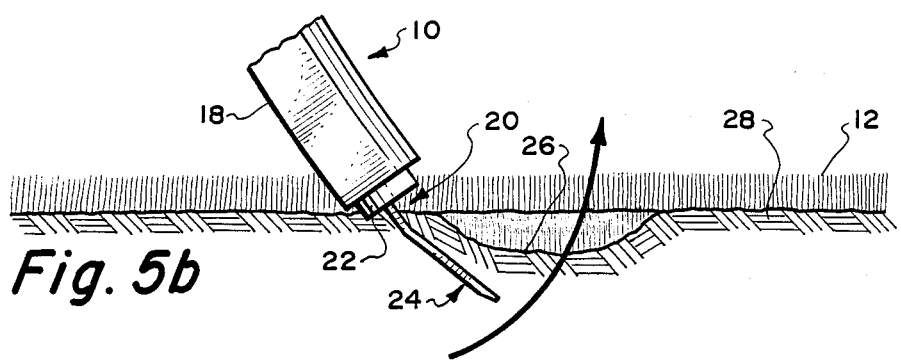
Figure 5C:
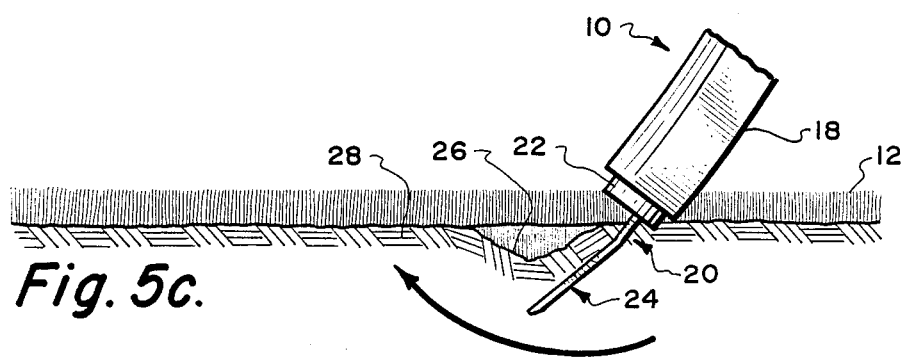
Figure 5D:
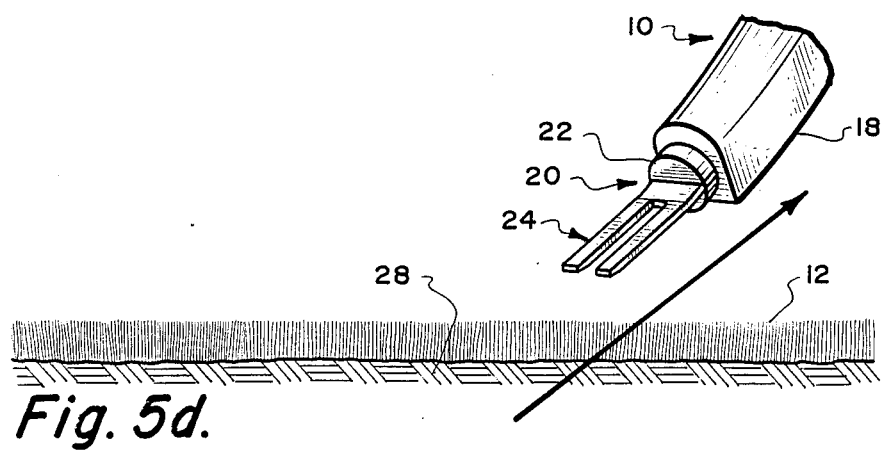

Referring to FIGS. 2–4, in accordance with the principles of the present invention, a ball mark repair tool, generally designated 20, is mounted on the hand grip end 14C of the shaft 14 of a golf club 10. In its basic components, the repair tool 20 includes a base 22 and an elongated prong 24. The base 22 of the tool 20 is in the form of a cylindrical plug, preferably composed of a hard, semi-rigid plastic. The base 22 is secured to the end 14C of the shaft 14 which is covered by the hand grip 18. The shaft 14 provides a handle extension from the base 22 to the club head 16 which is gripped by a player to manually operate the tool 20 to repair a ball mark 26 (FIGS. 5a–5c).

The elongated prong 24 of the tool 20 is preferably composed of a metal material, such as aluminum. The prong 24 is attached to the base 22 and projects therefrom and beyond an end 19 of the club hand grip 18. The prong 24 has a configuration for prying or twisting turf 28 (FIGS. 5a–5c) to repair the ball mark 26. More particularly, the prong 24 includes an inner mounting portion 30 and a pair of outer working portions in the form of a pair of laterally spaced fingers 32. The inner mounting portion 30 of the prong 24 is preferably permanently embedded in the base 22 of the tool 20.

The fingers 32 of the prong 24 are bent at a small angle away from the plane of the mounting portion 30 and the longitudinal axis of the club shaft 14 in a direction opposite to the direction in which the club head 16 extends away from the club shaft 14. This relationship of the prong 24 to the club head 16 enhances leverage in lifting and twisting the turf 28 to repair the ball mark 26 and also allows use of the club head 16 in applying the force to lift the indented turf.

The shaft 14 of the club 10 is typically hollow. The base 22 of the tool 20 has an outside diameter slightly smaller than the inside diameter of the hollow end 14C of the shaft 14 permitting the base 22 to fit therewithin. The base 22 also has at least one and preferably a pair of circumferential friction elements in the form of protruding rings 34 formed on its exterior for securing the base 22 to the shaft end 14C in a tight frictional fitting relation. However, the base 22 can be releasably attached to the shaft 14, such as by using fasteners, so as to be removable in case the prong 24 becomes damaged.

The repair tool 20 also includes a protective cover 36 removably mounted to the club shaft end 14C. The cover 36 can be composed of the same material as the club hand grip 18, such as rubber. The cover 36 has a hollow interior 38 for extending over and enclosing the turf prying prong 24. As seen in FIG. 1, the cover 36 constitutes an extension of the club hand grip 18. The cover 36 also can have a vent hole 39 through its upper end.

Preferably, the end 14C of the shaft 14 to which the tool base 22 is secured extends, a short distance, for instance ½ inch, beyond the end 18A of the club hand grip 18. In such an arrangement, the shaft end 14C and hand grip end 19 defines a seat 40 which inserts a short distance into the hollow interior 38 of the cover 36 for abutting an inner end 36A of the cover 36 with the end 19 of the hand grip 18. Optionally, a rigid reinforcing cup or sleeve 42 can be disposed within the hollow interior 38 of the cover 36.

The tool 20 can be installed on the club 10 at the factory or can be added as an after-market accessory. The tool 20 can be installed on almost any club by cutting the existing hand grip at a position equal to the combined length needed for the seat 40 and the prong 24. The remaining grip 18 on the club shaft 14 is slid upwardly on the shaft 14 to a distance equal to the seat 40. The reinforcement sleeve or insert 42 is placed in the removed grip portion or cover 36 and the tool 20 is inserted into the open end 14C of the shaft 14 with the prong 24 in the desired orientation. The cover 36 is then replaced with the exterior surfaces aligned as on the original club.

The tool 20 is operated by a player holding the club 10 by the clubhead 16 in a ball mark repairing orientation being substantially the reverse of a normal playing orientation. The club shaft 14 in providing the handle extension of the tool base 22 permits the player to operate the tool 20 while standing substantially erect.

Turning to FIGS. 5a–5d, there is illustrated a sequence of successive steps in using the tool 20 to manually repair the ball mark 26 on a playing surface or turf 28 of the golf course green 12. As seen in FIG. 5a, the a golf club 10 is gripped by the player at the head (not shown) and held in an inclined relation to the turf 28 in the ball mark repairing orientation reversed from its normal playing orientation. As seen in FIG. 5a, the prong 24 of the tool 20 is inserted into the turf 28 of the green 12 under one side of the ball mark 26. Then, the club 10 is pivoted toward the green 12 to cause pivoting of the prong 24 upwardly in the direction of the arrow toward the mark 26. Pivoting of the prong 24 raises a portion of the turf 28 containing the mark 26. If necessary, the prong can be rotated side to side to lift a densely compacted mark. Another way to lift densely compacted turf is to withdraw the prong 24 from under the ball mark 26. As seen in FIG. 5c, the tool prong 24 is then inserted into the turf 28 under the other side of the mark 26. Then, the club 10 is pivoted again toward the green 12, causing pivoting of the prong 24 upwardly toward the mark 26 and completing the raising of the portion of the turf 28 containing the mark 26.

A cylindrical base may not be necessary if the prong member is directly attached to the upper end of the shaft such as by adhesive, welding or use of a fastener such as a set of screws or bolts.

It is thought that the present invention and many of its attendant advantages will be understood from the foregoing description and it will be apparent that various changes may be made in the form, construction and arrangement of the parts thereof without departing from the spirit and scope of the invention or sacrificing all of its material advantages, the form hereinbefore described being merely a preferred or exemplary embodiment thereof.

I claim:

1. In combination with a golf club having an elongated shaft with a ball striking clubhead mounted to an end of said shaft and a portion of an elongated hand grip mounted about a portion of said shaft adjacent to an opposite end of said shaft, a ball mark repair tool, comprising:
   (a) fastening means secured to said opposite end of said shaft adjacent to said hand grip such that said shaft provides a handle extension for operating said tool to repair a ball mark;
   (b) an elongated element attached to said fastening means and projecting therefrom and beyond an end of said hand grip of said club, said element having a configuration for prying turf to repair the ball mark as said tool is operated by a player holding said club by said clubhead in a ball mark repairing orientation being substantially the reverse of a normal playing orientation, said club shaft in providing said handle extension of said fastening means permitting the player to operate said tool while standing substantially erect; and
   (c) a protective cover composed of an end portion of said club hand grip being removably mounted about said shaft opposite end and having a hollow interior for extending over and enclosing said turf prying element;
   (d) said shaft opposite end to which said fastening means is secured extending beyond an end of said portion of said club hand grip mounted about said club shaft so as to define a seat which inserts into and engages said hollow interior of said cover for abutting said cover with said end of said hand grip portion mounted about said shaft and thereby for completing said hand grip of said club.

2. The tool of claim 1 in which the fastening means comprises a base cylindrical element.

3. The tool of claim 2 wherein said turf prying element includes a prong having an inner mounting portion and an outer working portion.

4. The tool of claim 3 wherein said outer working portion is in the form of a pair of laterally spaced fingers being bent away from a longitudinal axis of said club shaft in a direction opposite to the direction in which said club head extends away from said club shaft.

5. The tool of claim 3 wherein said inner mounting portion of said prong is permanently embedded in said base.

6. The tool of claim 5 wherein said element on said base exterior is at least one circumferential friction ring.

7. The tool of claim 2 wherein: said opposite end of said club shaft is hollow; and said base has a size relative to that of said shaft opposite end which permits said base to fit therewithin, said base having at least one element on its exterior for securing said base to said shaft end in a tight fitting relation.

8. The tool of claim 1 further comprising: a rigid reinforcing sleeve disposed within said hollow interior of said cover.

9. A golf ball mark repair tool, comprising:
   (a) a base;
   (b) an elongated element attached to one end of said base and projecting therefrom in one direction, said element having a configuration for prying turf to repair a ball mark;
   (c) an elongated handle extension attached at one end to said base and extending therefrom in a direction opposite to said one direction, said handle extension being of sufficient length for permitting a player to operate said tool to repair the ball mark by gripping said handle extension while standing substantially erect;
   (d) said handle extension being a golf club having an elongated shaft with a ball striking clubhead mounted to an end of said shaft and a portion of an elongated hand grip mounted about a portion of said shaft adjacent to an opposite end of said shaft which constitutes said one end of said handle extension attached to said base, said clubhead for holding said tool in a ball mark repairing orientation, being substantially the reverse of a normal playing orientation of said golf club, for operating said tool to repair the ball mark; and
   (e) a protective cover composed of an end portion of said club hand grip being removably mounted about said shaft opposite end and having a hollow interior for extending over and enclosing said turf prying element;
   (f) said shaft opposite end to which said base is secured extending beyond an end of said portion of said club hand grip mounted about said club shaft so as to define a seat which inserts into and engages said hollow interior of said cover for abutting said cover with said end of said hand grip portion mounted about said shaft and thereby for completing said hand grip of said club.

10. The tool of claim 9 wherein said turf prying element includes a prong having an inner mounting portion and an outer working portion.

11. The tool of claim 10 wherein said outer working portion is in the form of a pair of laterally spaced fingers being bent away from a longitudinal axis of said base and handle extension.

12. The tool of claim 10 wherein said inner mounting portion of said prong is permanently embedded in said base.

13. The tool of claim 9 wherein: said handle extension has a shaft with a hollow end; and said base has a size relative to that of said shaft hollow end which permits said base to fit therewithin, said base having at least one element on its exterior for securing said base to said shaft end in a tight fitting relation.

14. The tool of claim 13 wherein said element on said base exterior is at least one circumferential friction ring.

* * * * *